United States Patent
AI et al.

(10) Patent No.: US 12,304,738 B2
(45) Date of Patent: May 20, 2025

(54) GOODS SORTING METHOD AND GOODS SORTING SYSTEM

(71) Applicant: HAI ROBOTICS CO., LTD., Guangdong (CN)

(72) Inventors: Xin AI, Guangdong (CN); Runfang Yu, Guangdong (CN); Hongxia Zhou, Guangdong (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 798 days.

(21) Appl. No.: 17/522,261

(22) Filed: Nov. 9, 2021

(65) Prior Publication Data

US 2022/0063915 A1  Mar. 3, 2022

Related U.S. Application Data

(63) Continuation of application No. PCT/CN2020/090635, filed on May 15, 2020.

(30) Foreign Application Priority Data

May 28, 2019  (CN) .......................... 201910452091.5

(51) Int. Cl.
  *B65G 1/137*  (2006.01)
  *G05B 19/4155*  (2006.01)
  (Continued)

(52) U.S. Cl.
  CPC ....... *B65G 1/1378* (2013.01); *G05B 19/4155* (2013.01); *G06Q 10/06312* (2013.01); *G06Q 10/0875* (2013.01); *G05B 2219/50391* (2013.01)

(58) Field of Classification Search
  CPC .............. B65G 1/1378; G05B 19/4155; G05B 2219/50391; G06Q 10/06312; G06Q 10/0875; G06Q 10/083
  See application file for complete search history.

(56) References Cited

U.S. PATENT DOCUMENTS

2007/0088631 A1  4/2007  Christ
2018/0026086 A1  9/2018  Lin et al.

FOREIGN PATENT DOCUMENTS

CN  206622328 U  * 11/2017
CN  109118137 A  1/2019
(Continued)

OTHER PUBLICATIONS

CN-109656243 spec EN translation (Year: 2017).*
(Continued)

*Primary Examiner* — Jacob S. Scott
*Assistant Examiner* — Erin Morris
(74) *Attorney, Agent, or Firm* — LADAS & PARRY LLP

(57) ABSTRACT

Embodiments of this application relate to a goods sorting method and a goods sorting system. The goods sorting method includes: generating at least one collection order, each collection order including a predetermined number of sorting orders and recording a plurality of stock keeping units; sending the collection order to at least one picking console in a preset collection order issuance mode; and moving a cargo box to a corresponding picking console so that goods corresponding to the stock keeping units recorded in the collection order are picked out. By means of the method, a large quantity of sorting orders can be processed simultaneously by generating and issuing the collection order, which greatly improves the efficiency of a picking operation.

16 Claims, 4 Drawing Sheets

(51) Int. Cl.
*G06Q 10/0631* (2023.01)
*G06Q 10/0875* (2023.01)

(56) References Cited

FOREIGN PATENT DOCUMENTS

| | | | | | |
|---|---|---|---|---|---|
| CN | 109472523 | A | | 3/2019 | |
| CN | 109583800 | A | | 4/2019 | |
| CN | 109656243 | A | | 4/2019 | |
| CN | 109658027 | A | | 4/2019 | |
| CN | 110245890 | A | | 9/2019 | |
| CN | 109656243 | B | * | 4/2022 | ....... G05B 19/41895 |
| WO | 2018213887 | A1 | | 11/2018 | |
| WO | WO-2019047523 | A1 | * | 3/2019 | ........... B65G 1/1373 |

OTHER PUBLICATIONS

CN-206622328 spec EN translation (Year: 2016).*
WO-2019047523 spec EN translation (Year: 2018).*
ISR for International Application PCT/CN2020/090635 mailed Aug. 21, 2020.

* cited by examiner

GOODS SORTING METHOD AND GOODS SORTING SYSTEM

CROSS-REFERENCE TO RELATED APPLICATIONS

This application is a continuation under 35 U.S.C. § 120 of international patent Application No. PCT/CN2020/090635, filed on May 15, 2020, which claims priority to Chinese Patent Application No. 2019104520915, filed on May 28, 2019, both of which are incorporated herein by reference in their entireties.

BACKGROUND

Technical Field

Embodiments of this application relate to the field of electronic information technologies, and in particular, to a goods sorting method and a goods sorting system.

Related Art

With the continuous enhancement and development of social commercial trade, logistics and warehousing management have also been increasingly important and received growing attention. How to provide fast and efficient logistics and warehousing management services is a current hot-button issue.

Relying on the development of electronic information technologies, for example, automation industries such as industrial robots, in many existing cargo warehouses, robots or other automation devices cooperate with each other to carry out warehousing management to implement efficient cargo or warehousing management.

However, in the existing automation warehousing management system, a single order and a specific robot are usually bound to each other to complete the picking and order packing operations, the degree of optimization is not high, and there is still a lot of room for improvement in terms of order picking efficiency.

SUMMARY

To resolve the foregoing technical problem, an embodiment of this application provides a goods sorting method and a goods sorting system with a high degree of optimization.

To resolve the foregoing technical problem, the embodiments of this application provide the following technical solution: a goods sorting method. The goods sorting method includes:
  generating at least one collection order, each collection order including a predetermined number of sorting orders and recording a plurality of stock keeping units;
  sending the collection order to at least one picking console in a preset collection order issuance mode; and
  moving a cargo box to a corresponding picking console so that goods corresponding to the stock keeping units recorded in the collection order are picked out.

Optionally, the sending the collection order to at least one picking console in a preset collection order issuance mode includes:
  taking all picking consoles as a whole, and issuing the collection order to all the picking consoles so that goods corresponding to stock keeping units recorded in all issued collection orders can be picked out at any picking console.

Optionally, the moving a cargo box to a corresponding picking console includes: determining an estimated task completion time of each picking console according to one or more related factors; and moving a cargo box to a picking console with the shortest estimated task completion time.

Optionally, the related factors include: a length of a current picking queue of the picking console and/or an estimated time for the cargo box to arrive at the picking console.

Optionally, the sending the collection order to at least one picking console in a preset collection order issuance mode includes: splitting the collection order with a stock keeping unit as a unit; and allocating a stock keeping unit recorded in the collection order to a corresponding picking console, so that each picking console forms a corresponding picking list.

Optionally, the allocating a stock keeping unit recorded in the collection order to a corresponding picking console includes: determining candidate picking consoles that are selectable for the current stock keeping unit; and allocating the current stock keeping unit to a candidate picking console with the highest priority according to priorities of the candidate picking consoles.

Optionally, the allocating the stock keeping unit to a candidate picking console with the highest priority according to priorities of the candidate picking consoles includes: calculating lengths of picking lists of the candidate picking consoles; and allocating the current stock keeping unit to a candidate picking console with the smallest picking list length among the candidate picking consoles.

Optionally, before the calculating lengths of picking lists of the candidate picking consoles, the method further includes: preferentially allocating the current stock keeping unit to a candidate picking console whose picking list includes the same stock keeping unit as the current stock keeping unit among the candidate picking consoles.

Optionally, the allocating the stock keeping unit to a candidate picking console with the highest priority according to priorities of the candidate picking consoles includes:
  allocating, when the current stock keeping unit has a unique candidate picking console, the stock keeping unit to the unique candidate picking console.

Optionally, the determining candidate picking consoles that are selectable for the current stock keeping unit includes:
  allocating a corresponding warehouse region for each picking console; and
  determining the candidate picking consoles that are selectable for the current stock keeping unit according to cargo boxes contained in the warehouse region and stock quantities in the cargo boxes.

Optionally, the generating at least one collection order includes:
  calculating coincidence proportions of recorded stock keeping units between the different sorting orders; and
  combining first n sorting orders with the highest coincidence proportion to form one collection order, where n is a predetermined number.

Optionally, after the step of generating at least one collection order, the method further includes: selecting and issuing one or more collection orders among the at least one collection order, to meet a preset preferred condition, where the preset preferred condition is that the coincidence proportion of the recorded stock keeping units between the selected collection order and the unselected collection order is smallest.

Optionally, the method further includes: performing secondary sorting on all goods picked out to form a plurality of sorting packages corresponding to sorting orders.

Optionally, the method further includes: controlling the picking console to pick out goods corresponding to each collection order and place the goods in a region corresponding to each collection order when two or more collection orders are issued to the picking console.

To resolve the foregoing technical problem, the embodiments of this application further provide the following technical solution: a non-volatile computer-readable storage medium.

The non-volatile computer-readable storage medium stores computer program instructions, and the computer program instructions, when being called by a processor, causes a processor to perform the goods sorting method described above.

To resolve the foregoing technical problem, the embodiments of this application further provide the following technical solution: a goods sorting system.

The goods sorting system includes a processing terminal, a picking console, and a robot; the picking console is configured to pick one or more goods from a cargo box; the robot is configured to transport the cargo box between a warehouse and the picking console; and the processing terminal is communicatively connected to the picking console and the robot respectively, and is configured to perform the above-mentioned goods sorting method, to control the robot and the picking console to generate an order package corresponding to one or more collection orders.

To resolve the foregoing technical problem, the embodiments of this application further provide the following technical solution: a computer program product.

The computer program product includes a computer program stored on a non-volatile computer-readable storage medium, the computer program includes program instructions, and the program instructions, when being executed by a processor, cause the processor to perform the above-mentioned goods sorting method.

Compared with the related art, in the goods sorting method provided in the embodiments of this application, a picking operation is performed in a collection mode. In the form of a collection order, a plurality of different sorting orders can be processed simultaneously, which greatly optimizes a process of the picking operation and improves the efficiency of picking out goods corresponding to sorting orders.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

Figure 1:
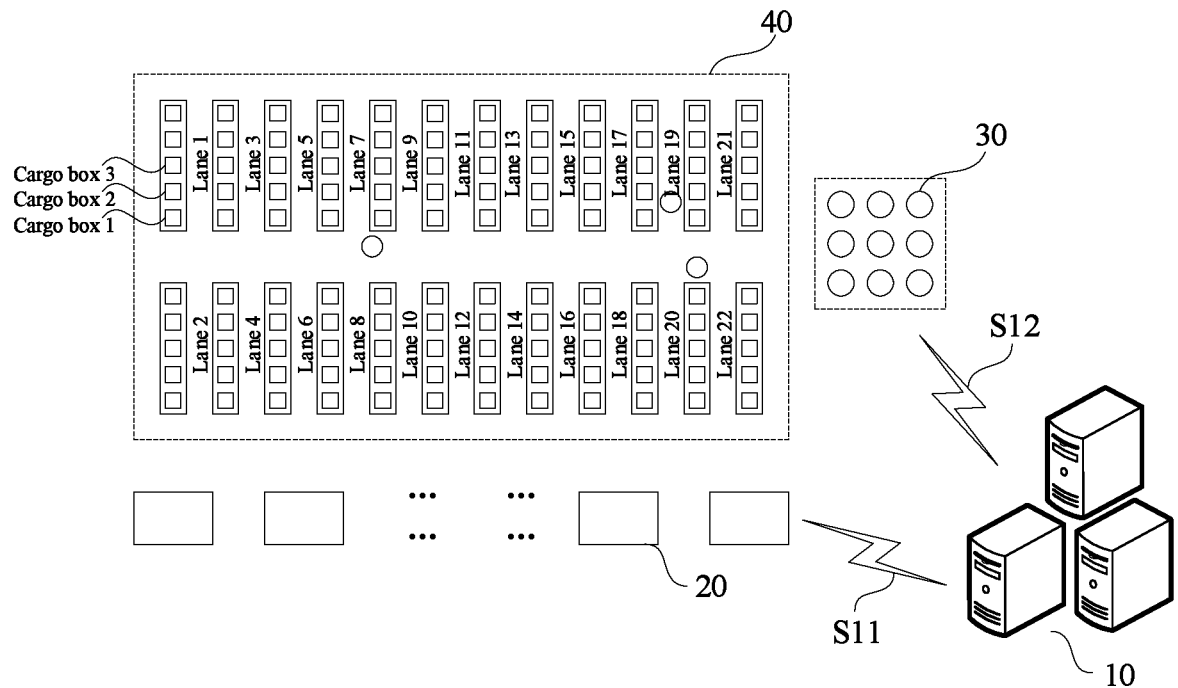
FIG. 1 is a schematic diagram of an application environment according to an embodiment of this application.

For ease of understanding this application, this application is described in further detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of this application, rather than indicating or implying that the mentioned apparatus or component needs to have a particular orientation or needs to be constructed and operated in a particular orientation. Therefore, such terms should not be construed as limiting of this application. In addition, terms "first", "second" and "third" are only used to describe the objective and cannot be understood as indicating or implying relative importance.

Unless otherwise defined, all technical and scientific terms used herein have the same meaning as commonly understood by one of ordinary skill in the art to which this application belongs. The terms used in the specification of this application are merely used for describing specific embodiments, and are not intended to limit this application. A term "and/or" used in this specification includes any or all combinations of one or more related listed items.

In addition, technical features involved in different embodiments of this application described below may be combined with each other as long as there is no conflict.

Goods sorting refers to a process of picking out goods corresponding to an order from a warehouse or other suitable type of goods storage place and completing packing of the goods to form a final order package for delivery. The goods sorting efficiency may be determined by the quantity of order packages processed in a unit time. The more order packages processed in a unit time, the higher the goods sorting efficiency.

The goods sorting efficiency may be improved through a variety of different optimization methods. For example, a sorting mode of "collection order" provided in this embodiment may be used to process sorting orders in a certain period of time according to categories or goods categories simultaneously, to initially pick out goods. In this way, wasting time in running to and from a warehouse can be avoided.

After secondary sorting is further performed on the initially picked goods according to the different sorting orders, a final order package may be completed and delivered to enter a logistics transportation stage.

In an automated goods sorting process, the same goods are usually stored in the same cargo box. Each cargo box is placed in a specific location in a warehouse according to specific storage rules, and goods stored in the cargo box are marked by using an external feature of the cargo box (which may be, for example, an identifier such as a two-dimensional code or a barcode).

FIG. 1 shows an application environment according to an embodiment of this application. As shown in FIG. 1, the application environment includes a goods sorting system including a processing terminal 10, a picking console 20, and a robot 30, and a warehouse 40 where the goods sorting system is applied and a plurality of goods are stored.

The processing terminal 10 can be any type of electronic computing platform or device as a control core of the entire goods sorting system. According to actual needs, the processing terminal may have corresponding storage space or computing capabilities to provide one or more application services or functions, such as receiving orders to be delivered, issuing orders, or controlling the robot to perform tasks of picking and placing goods.

Figure 2:
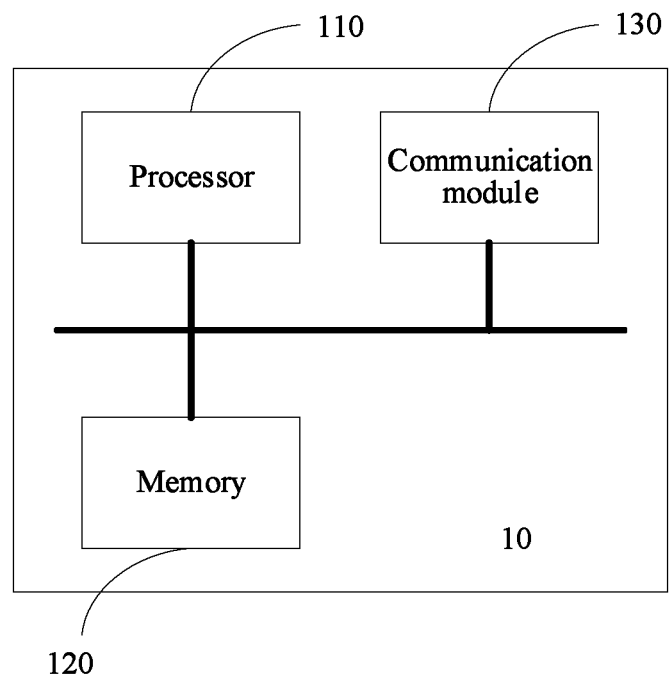
FIG. 2 is a structural block diagram of a processing terminal according to an embodiment of this application.

FIG. 2 is a structural block diagram of an electronic computing platform for implementing all or part of the functions of the processing terminal 10. As shown in FIG. 2, the electronic computing platform 100 may include a processor 110, a memory 120, and a communication module 130.

Any two of the processor 110, the memory 120, and the communication module 130 are communicatively connected by a bus.

The processor 110 may be any type of processor that has one or more processing cores. The processor 110 can perform single-threaded or multi-threaded operations and is configured to analyze instructions to perform operations such as obtaining data, performing logical operation functions, and issuing operation processing results.

The memory 120 is a non-volatile computer-readable storage medium, for example, at least one magnetic disk storage device, a flash memory, a distributed storage device remotely disposed relative to the processor 110 or other non-volatile solid-state storage device.

The memory 120 may have a program storage region for storing non-volatile computer-executable program instructions (in some other embodiments, may also be referred to as a "non-volatile software program"), for the processor 110 to call to cause the processor 110 to perform one or more method steps, for example, one or more steps in the goods sorting method provided in the embodiments of this application. The memory 120 may further have a data storage region used to store the operation processing results issued and outputted by the processor 110.

The communication module 130 is a functional module configured to establish a communication connection to devices such as a robot and/or a picking console and provide a physical channel.

The picking console 20 is an automation device for picking out the goods from the cargo box. Specifically, the picking console can be provided with one or more different types of action mechanisms and functional modules (such as a conveyor belt matched with a robot) according to an actual goods picking principle or warehouse design requirements.

The quantity of picking consoles 20 can be determined by actual indicators such as a floor area of a warehouse, construction costs, and the picking efficiency that the goods sorting system needs to achieve. For example, three or more picking consoles 20 may be arranged.

The robot 30 is an automation device, such as an AGV vehicle, that is provided with a travelling mechanism and that can move between the picking console 20 and the warehouse, and transport the cargo box to perform operations of picking and placing goods. The travelling mechanism may adopt any suitable type of power system.

In some embodiments, the robot 30 may be driven by electricity. Correspondingly, a charging region for the robot 30 to be charged may be further arranged. The robot 30 starts from the charging region to work and can return to the charging region for charging when the power is insufficient.

The robot 30 has one or more functional indicators, including but not limited to cargo carrying capacity (that is, the maximum quantity of cargo boxes that can be loaded each time), endurance mileage, guidance mode, cargo box pick-and-place speed, and running speed.

Similarly, the quantity of robots 30 may also be determined by actual design indicators such as a floor area of the warehouse, the quantity of picking consoles, and a target picking efficiency. The processing terminal 10 can perform optimization and planning according to information such as a position and functional indicators (such as current cargo carrying capacity and remaining endurance mileage) of the robot 30 to control the robot 30.

The warehouse 40 is a region for storing the cargo boxes. In order to facilitate management, a plurality of shelves may be arranged in the warehouse 40, and a plurality of identical or different cargo boxes are placed on each shelf according to a specific placement rule.

As shown in FIG. 1, these shelves are divided at intervals to form a plurality of lanes for the robot 30 to enter. After entering a lane, the robot 30 picks out or places back a specific cargo box (such as a cargo box 1, a cargo box 2, or a cargo box 3). The robot may enter and exit the lane from both ends of the lane. Openings located at both ends of the lane are referred to as "lane openings", which can be used as an exit of the robot 30 or an entrance of the robot 30.

In some embodiments, directions between some lanes are the same, and lane openings between two lanes, for example, lane 1 and lane 2 shown in FIG. 1 are opposite so that the robot 30 can pass directly. Such two lanes are called "adjacent lanes". That is, when travelling from the lane 1 to a lane adjacent thereto, namely, the lane 2, or from the lane 2 to a lane adjacent thereto, namely, the lane 1, the robot 30 can directly enter without turning.

Goods stored in the cargo boxes in the warehouse 40 are managed in a unit of stock keeping unit (SKU, which may also be referred to as "goods case"). The stock keeping unit is a basic unit of stock in and out measurement or stock control, which may be in a unit of a piece, a tray, or a box (depending on specific goods). The same goods may alternatively belong to different SKUs due to differences in production date, size, and color.

Figure 3:
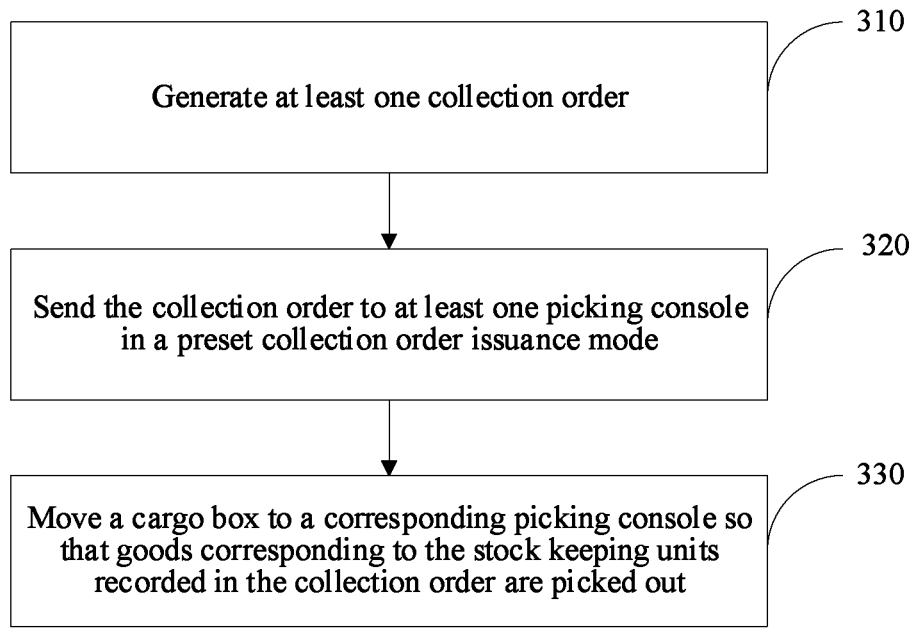
FIG. 3 is a flowchart of a goods sorting method according to an embodiment of this application.

In an application scenario shown in FIG. 1, the goods sorting method that is provided in the embodiments of this application and in which a collection mode is adopted can be used to optimize a picking process and improve the efficiency of generating order packages. FIG. 3 is a flowchart of a goods sorting method according to an embodiment of this application.

As shown in FIG. 3, the goods sorting method includes the following steps.

310. Generate at least one collection order. Generating the collection order can be completed in a processing terminal or other suitable electronic computing device.

Each collection order is formed by combining a predetermined number of sorting orders and records a plurality of stock keeping units. The sorting order may be a multi-goods order that contains a plurality of stock keeping units or in which there are a plurality of pieces for the same stock keeping unit, or a single-goods order that contains only one stock keeping unit and in which there is only one piece for the stock keeping unit.

The quantity of sorting orders contained in each collection order can be set according to actual needs, for example, a maximum of 40 sorting orders can be combined to form one collection order.

In some embodiments, the collection orders can be clustered according to coincidence proportions of different sorting orders, to obtain a collection order with a short stock keeping unit list as much as possible. Specifically, the coincidence proportions of the recorded stock keeping units among all the sorting orders can be first calculated. The coincidence proportion refers to the quantity of the same stock keeping units contained between two sorting orders. Then, sorting can be performed according to the coincidence proportions, and first n sorting orders with the highest coincidence proportion are combined to form one collection order. n is a predetermined number whose value is a positive integer.

In this way, orders that require the same goods can be clustered into a collection order as much as possible, and a cargo box re-picking rate of the collection order can be reduced to improve the efficiency of the entire goods sorting system.

Specifically, the quantity of sorting orders that the goods sorting system needs to process is very large, and the quantity of collection orders that can be executed each time is limited. Therefore, clustered orders that have been generated can be further selected according to a preset preferred condition, and a part of the collection orders can be preferentially executed.

In some embodiments, the preset preferred condition may be: the coincidence proportion of the recorded stock keeping units between the selected collection order and the unselected collection order is smallest. Such a preferred condition is also beneficial to reduction in a cargo box re-picking rate and improvement in the operating efficiency of the system.

320. Send the collection order to at least one picking console in a preset collection order issuance mode.

The "collection order issuance mode" refers to a specific policy adopted when collection orders are sent to each picking console to determine some collection order that need to be executed by the picking console. The collection order issuance mode can be specifically adjusted and determined according to actual needs.

330. Move a cargo box to a corresponding picking console so that goods corresponding to the stock keeping units recorded in the collection order are picked out.

As shown in FIG. 1, in an automation sorting system, movements of the cargo box can usually be completed by the robot. The processing terminal 10 can allocate a picking task to the robot according to the stock keeping unit contained in the collection order, so that the picking console and the robot cooperate with each other to complete the picking operation of the collection order, and the corresponding goods are all picked out.

During actual use, the processing terminal 10, on the one hand, may send the collection order to at least one picking console 20 in a preset collection order issuance mode (S11), and on the other hand, allocate at least one picking task to the robot 30 according to the collection order (S12). The picking task refers to a data packet that includes at least a cargo box corresponding to a stock keeping unit and position information of the cargo box. Specifically, any suitable data type or data format can be adopted for the data packet.

The robot 30 can travel back and forth between the warehouse 10 and the picking console 20 under a guidance of the picking task, pick out the cargo box corresponding to the picking task from a shelf of the warehouse, and transport the cargo box to the corresponding picking console 20. The picking console picks out the goods corresponding to the stock keeping unit recorded in the collection order from the cargo box.

It should be noted that there is no sequence relationship between a step of issuing, by the processing terminal 10, the collection order to the picking console and a step of allocating the picking task to the robot. The two steps are independent of each other and do not have a significant impact on each other. The processing terminal 10 may choose to perform, at any time, the foregoing steps of issuing the collection order and allocating the picking task.

For example, the collection order can be issued and the picking task can be allocated simultaneously; or the collection order can be issued first, and then the picking task can be allocated to the robot; or the picking task can be allocated to the robot first, and then the collection order can be issued.

In this embodiment of this application, the goods sorting method of the collection order enables the goods sorting system to process a plurality of sorting orders simultaneously, and pick out the goods corresponding to these sorting orders. By means of the collection order sorting method, a process of the picking operation is effectively optimized, thereby avoiding an empty running between a warehouse and a console, improving the efficiency of the picking operation, and having a good application prospect.

In some embodiments, after step 330, secondary sorting may be further performed on the picked goods to form a plurality of order packages corresponding to the sorting orders.

For example, the picked goods of each collection order can be transported by using a conveyor belt or in other conveying manner from each picking console to a secondary sorting region for concentration and secondary sorting, and a final order package is obtained to complete a whole delivery process. Specifically, any type of goods sorting method can be selected and used for the secondary sorting.

In this embodiment, in combination with initial collection mode sorting and the secondary sorting, order packages in a one-to-one correspondence to the sorting orders can be finally formed, which has higher order processing efficiency and can better meet usage requirements of logistics and warehousing management.

When performing a step of issuing the collection order, the processing terminal 10 can specifically use two different collection order issuance modes, such as overall issuance and split issuance. The two collection order issuance modes are described below respectively with reference to specific examples shown in FIG. 4 and FIG. 5.

Figure 4:
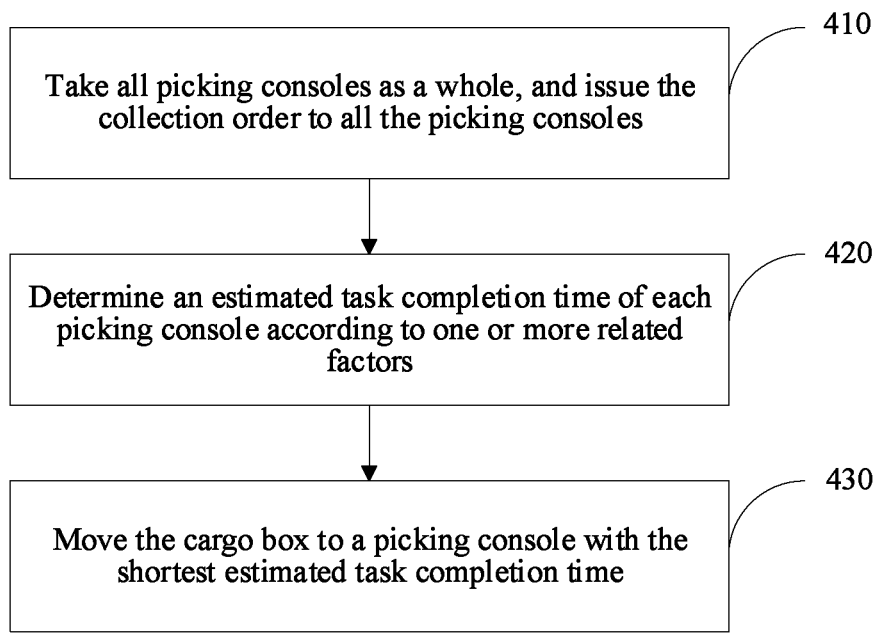
FIG. 4 is a flowchart of a method for issuing a collection order according to an embodiment of this application.

As shown in FIG. 4, for a mode of the overall issuance of the collection order, a specific process of the picking operation includes:

410. Take all picking consoles as a whole, and issue the collection order to all the picking consoles when the collection order is issued by the processing terminal.

The taking all picking consoles as a whole refers to the use of a unified variable to represent different picking consoles so that goods corresponding to stock keeping units recorded in all issued collection orders can be picked out at any picking console.

That is, for an entire picking system, there is no difference between different picking consoles, and a corresponding picking console is not set in advance for a certain stock keeping unit in the collection order. An actual picking console for picking the goods can be dynamically changed.

In some embodiments, when the quantity of collection orders issued to the picking console is greater than or equal to two, the picking console can pick out the goods corresponding to the same collection order and place such goods in the same region. For example, when a collection order A and a collection order B are issued, the picking console can perform the picking operation for the collection order A and the collection order B simultaneously, and determine the collection order to which the picked goods belong and correspondingly place the picked goods in a region A corresponding to the collection order A or a region B corresponding to the collection order B.

420. Determine an estimated task completion time of each picking console according to one or more related factors.

The system does not designate a specific picking console when issuing the collection order, and the overall issuance mode is used. Therefore, the robot can move the cargo box to any picking console to pick out goods.

In order to maximize the picking efficiency of the system, the processing terminal can evaluate an execution time required for transportation to different picking consoles, and use the execution time as a determining standard to obtain an optimal solution.

The estimated task completion time refers to the time required to complete a certain picking task and pick out goods corresponding to the picking task from the cargo box. It is understandable that the estimated task completion time may be affected by many different related factors in two links in which the robot transports the cargo box to the picking console and the picking console picks out the goods from the cargo box, such as a length of a current picking queue of the picking console and/or an estimated time required for the cargo box to arrive at the picking console.

The length of the picking queue indicates a waiting time required for the picking console to pick out the goods. The picking queue is formed by sequentially arranging the goods corresponding to the stock keeping unit that need to be picked out by the picking console. That is, a picking console with a longer picking queue length requires a longer estimated task completion time.

The robot usually needs to move to the picking console after picking out the cargo box in the warehouse to enable the cargo box to arrive at the picking console to complete an operation of picking out the goods. Therefore, an estimated time for the cargo box to arrive at the picking console may also affect the length of the estimated task completion time. For example, when a distance between a position of the cargo box and the picking console is longer, because the robot moves by a longer distance, the required estimated task completion time is also longer.

After corresponding calculation is performed with reference to features of different related factors, an approximate execution time may be obtained. For example, according to a distance and a running speed of the robot, the time required for the robot to move to each picking console can be determined by calculation (added as part of the estimated task completion time). Alternatively, the waiting time of the robot can be determined by calculation according to the length of the picking queue and a unit time required for the picking console to pick out goods in the cargo box.

After the foregoing plurality of times such as the moving time and the waiting time are superimposed, the estimated task completion time for each picking console to pick out the goods (that is, to complete a certain picking task) can be roughly determined.

Certainly, the more considered related factors there are, the more accurate the estimated task completion time determined by calculation is, but a corresponding consumed calculation time and model complexity are also higher. Therefore, technicians can select some of the related factors for calculation according to actual needs, as long as a rough estimated task completion time result can be obtained.

For example, when the area of the warehouse is small and the running speed of the robot is high, an impact of the estimated time for the cargo box to arrive at the picking console can alternatively be ignored, and more attention is paid to a current queuing sequence length of the picking console.

430. Move the cargo box to a picking console with the shortest estimated task completion time.

It is understandable that the picking console with the shortest task completion time is an optimal solution for the robot 30 to complete a current picking task. Therefore, the picking console with the shortest task completion time can be determined as the target picking console, and the cargo box is moved to the picking console for the goods picking operation to improve the working efficiency of the robot 30 as much as possible and reduce the waiting time of the robot 30.

In an embodiment of the overall issuance of the collection order, the picking consoles can be treated equally during picking, and can be dynamically adjusted according to actual picking task allocation of the robot 30, which has a better optimization effect. Certainly, in this method, the processing terminal 10 is required to keep real-time tracking and updating of the robot 30 to ensure a balance of each picking console.

Figure 5:
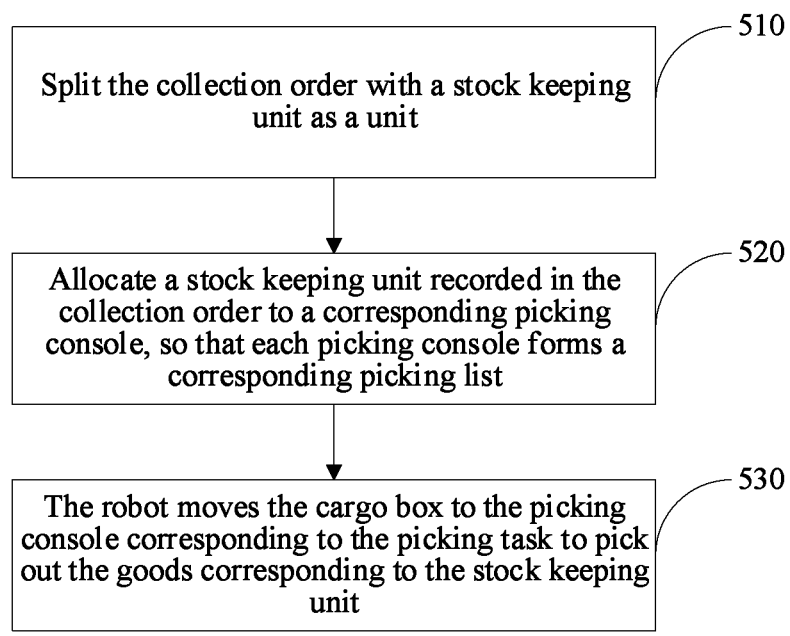
FIG. 5 is a flowchart of a method for issuing a collection order according to another embodiment of this application.

As shown in FIG. 5, a specific process of the goods sorting method for split issuance of a collection order includes the following steps.

510. Split the collection order with a stock keeping unit as a unit.

As described in the above embodiment, the collection order contains a plurality of different stock keeping units. The collection order can be split into a plurality of different sub-orders with the stock keeping units which are the smallest unit of stock management.

Specifically, the quantity of sub-orders formed by the split can be the same as the quantity of picking consoles.

520. Allocate a stock keeping unit recorded in the collection order to a corresponding picking console, so that each picking console forms a corresponding picking list.

After the collection order is split, according to features of different stock keeping units of each sub-order, the sub-order can be issued or allocated to a corresponding picking console based on a specific rule. After receiving the issued sub-orders, the picking console can form the corresponding picking list according to a receiving order, and sequentially pick out the goods from the cargo box transported by the robot 30.

In some embodiments, split of a collection order may be a process that is performed synchronously with order issuance, and a plurality of collection orders may alternatively be split simultaneously. That is, the processing terminal can sequentially allocate each stock keeping unit in the collection order to the corresponding picking console until all the collection orders are allocated and a process of splitting the collection orders is completed.

An allocation manner of the stock keeping unit may specifically include the following steps. First, candidate picking consoles selectable for the current stock keeping unit are determined. Specifically, picking consoles can be screened according to a variety of different standards, to single out suitable candidate picking consoles.

In some embodiments, the candidate picking consoles can be determined in the following manner. First, according to locations of the picking consoles, the warehouse 40 is correspondingly divided into a corresponding quantity of warehouse regions, to cause each picking console to be responsible for one warehouse region.

Then, the candidate picking consoles that are selectable for the current stock keeping unit are determined according to cargo boxes contained in the warehouse region and stock quantities in the cargo boxes. That is, when a corresponding stock keeping unit can be picked out from a warehouse region for which a picking console is responsible, the picking console can be determined as a candidate picking console. It is understandable that there may be a plurality of candidate picking consoles that are finally singled out.

Then, the current stock keeping unit is allocated to a candidate picking console with the highest priority according to priorities of the candidate picking consoles.

According to a current situation of different picking consoles (such as the length of the picking list), a priority order of the picking consoles can be measured and determined according to a set standard, and corresponding priorities are given. The candidate picking console with the highest priority is the best choice to perform the picking operation of the stock keeping unit in the current situation.

530. The robot moves the cargo box to the picking console corresponding to the picking task to pick out the goods corresponding to the stock keeping unit.

The split issuance mode of a collection order provided in this embodiment is different from the overall issuance mode of a collection order in that the target picking console corresponding to the stock keeping unit is predetermined, and different picking consoles are not equal in a process of performing working tasks. Compared with the overall issuance mode, the split issuance mode is easier to implement in the processing terminal.

Figure 6:
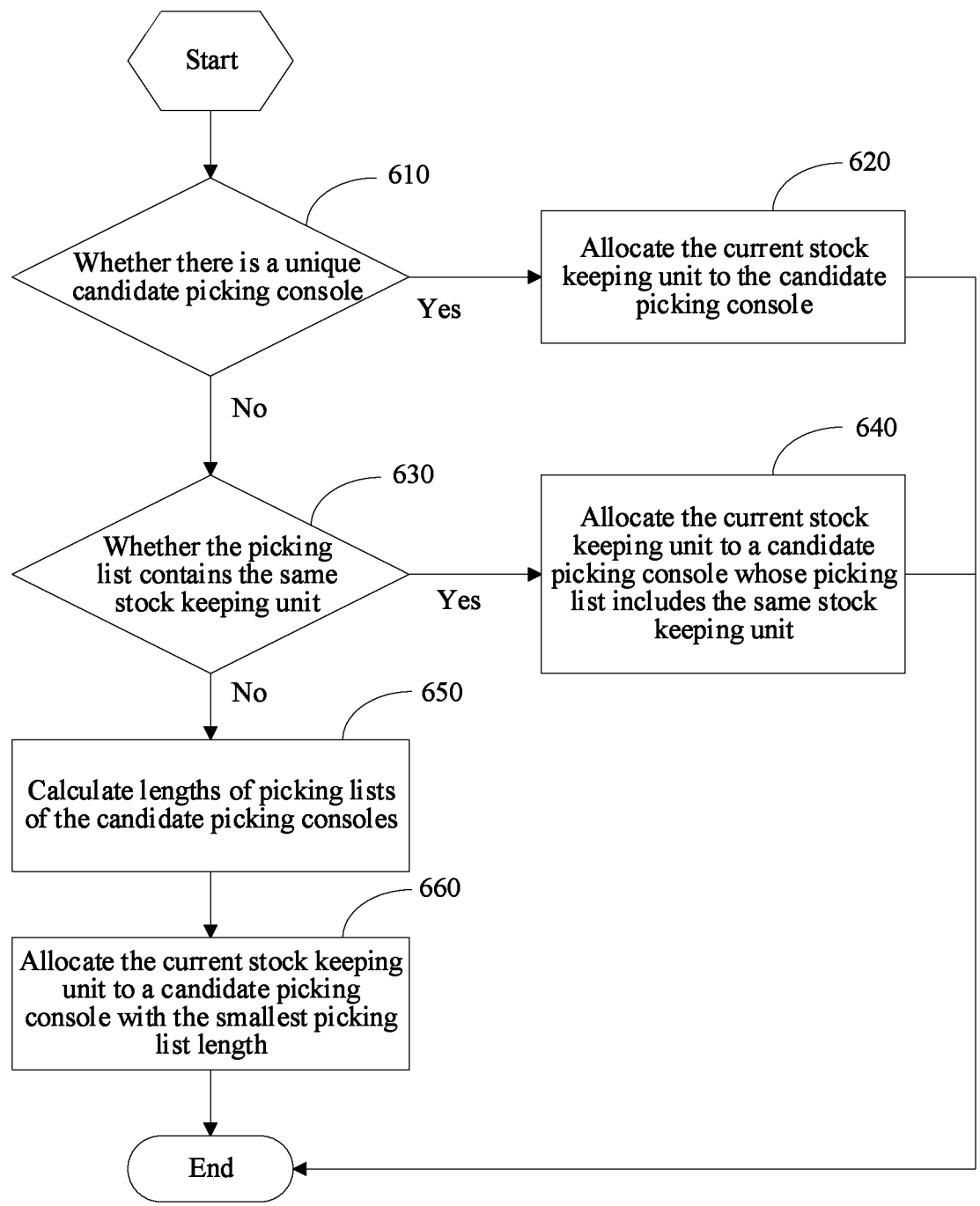
FIG. 6 is a flowchart of a method for selecting a target picking console according to an embodiment of this application.

In a process of splitting the collection order shown in FIG. 5, an allocation process shown in FIG. 6 can be used for the stock keeping units of the determined candidate picking console.

610. Determine whether the current stock keeping unit has a unique candidate picking console. If yes, step 620 is performed; and if not, step 630 is performed. In an initial stage, quick division is first performed according to the quantity of candidate picking consoles.

In a case that there is a unique candidate picking console, in order to simplify an operation, the stock keeping unit can be allocated to the unique candidate picking console by default.

620. Allocate the current stock keeping unit to the candidate picking console.

630. Determine whether picking lists of the candidate picking consoles contain the same stock keeping unit as the current stock keeping unit. If yes, step 640 is performed; and if not, step 650 is performed.

In a case that there are a plurality of candidate picking consoles, the picking console can be selected according to the stock keeping unit included in the picking list. In this selection method, the same stock keeping unit is allocated to the same picking console as much as possible, which can optimize and improve the picking efficiency.

640. Allocate the current stock keeping unit to a candidate picking console whose picking list includes the same stock keeping unit as the current stock keeping unit among the candidate picking consoles.

650. Calculate lengths of the picking lists of the candidate picking consoles.

If there is no current stock keeping unit in the picking lists of all the candidate picking consoles, allocation can be performed according to the lengths of the picking lists. The length of the picking list indicates a workload that the picking console needs to complete.

660. Allocate the current stock keeping unit to a candidate picking console with the smallest picking list length among the candidate picking consoles.

By allocating the stock keeping unit to the candidate picking console with the shortest picking list length, a workload of the picking consoles can be averaged or equalized, thereby avoiding excessiveness of a picking workload of a certain picking console and facilitating improvement in the picking efficiency.

In a split process shown in FIG. 6, a target picking console corresponding to each stock keeping unit is sequentially determined according to three priority determining standards of the quantity of candidate picking consoles, whether the same stock keeping unit exists in the picking list, and the length of the picking list. Steps 610 to 660 are repeated until the target picking consoles of all the stock keeping units in the collection order are determined, thereby completing split of the collection order.

In this method, the number of repeated pick-and-place operations of the picking console can be reduced as much as possible, to achieve a workload balance between the picking consoles, and optimize a movement distance of the robot to the picking console.

It should be noted that the process shown in FIG. 6 is only intended to describe but is not intended to limit a specific implementation of the embodiments of this application. A person skilled in the art can understand that the above-mentioned three priority determining standards have no obvious correlation between each other, and can be respectively used in different embodiments.

In some other embodiments, one or more of the priority determining standards can also be selectively used without strictly following the process shown in FIG. 6. For example, only lengths of picking lists of the candidate picking consoles can be calculated, and then the stock keeping unit is allocated according to the lengths of the picking lists.

Referring to FIG. 1, in a process of goods sorting, the processing terminal 10, on the one hand, needs to issue the collection order to each picking console in an appropriate manner, and determine a target picking console corresponding to each stock keeping unit in the collection order. On the other hand, the processing terminal 10 further needs to allocate an appropriate picking task to each robot 30, to cause the robot to move between the warehouse and the target picking console, and transport the corresponding cargo box.

An embodiment of this application further provides a picking task allocation method. The picking task allocation method can be used in conjunction with a collection order issuing method provided in an embodiment of this application to achieve the best picking efficiency optimization effect.

However, it should be noted that the above-mentioned two methods are independent of each other, and optimization policies and optimization directions adopted are not the same. Therefore, the picking task allocation method is a technical solution that can be independently implemented. The picking task allocation method provided in the embodiments of this application can be applied to picking task allocation in any goods sorting method, and the technical effects of reducing empty running of the robot and improving the picking efficiency can also be achieved.

In summary, in the goods sorting method provided in the embodiments of this application, the collection order sorting method is used, which can simultaneously carry out picking operations of a plurality of stock keeping units and a plurality of orders, thereby having high goods sorting and order packing efficiency, and well improving the effect of warehouse and logistics management.

Further, after the initial sorting of the collection order is completed, any sorting method can be applied. The final order package can be obtained after the secondary sorting is performed according to each sorting order, to complete the whole order delivery process.

In addition to adjusting the sorting order issuance method, the processing terminal 10 further uses the corresponding picking task allocation optimization solution (such as an exchange of picking tasks or priority ranking of positions of cargo boxes) according to features of an actual application scenario, to optimize and adjust the picking task of the robot, thereby further improving the working efficiency of the entire system.

Those skilled in the art may choose to use corresponding software, hardware, or a combination of software and hardware (for example, one or more comparison circuits) to implement functional steps or service applications according to the functional steps or service applications to be performed by the processing terminal disclosed in the embodiments of this application. According to the functional steps to be implemented, the method of selecting and designing a hardware circuit is well-known to those skilled in the art and is common knowledge in the technical field, and the details are not described herein.

A person of ordinary skill in the art may be further aware that, in combination with examples of each step of the goods sorting method described in the embodiments disclosed in this specification, this application may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions.

A person skilled in the art may use different methods to implement the described functions for each particular application, but this implementation shall not be considered as going beyond the scope of this application. The computer software may be stored in a computer-readable storage medium. When being executed, the program may include the processes of the embodiments of the foregoing methods. The storage medium may be a magnetic disk, an optical disc, a read-only memory (ROM), or a random access memory (RAM).

Finally, it should be noted that the foregoing embodiments are merely intended for describing the technical solutions of this application rather than limiting this application. Under the ideas of this application, the technical features in the foregoing embodiments or different embodiments may also be combined, the steps may be performed in any order, many other changes of different aspects of this application also exist as described above, and these changes are not provided in detail for simplicity. Although this application is described in detail with reference to the foregoing embodiments, a person of ordinary skill in the art should understand that modifications may be still made to the technical solutions described in the foregoing embodiments or equivalent replacements may be made to some technical features thereof, as long as such modifications or replacements do not make the essence of corresponding technical solutions depart from the scope of the technical solutions of the embodiments of this application.

What is claimed is:

1. A goods sorting method, comprising:
generating, by a processing terminal, at least one collection order, each collection order comprising a predetermined number of sorting orders and recording a plurality of stock keeping units;
sending, by the processing terminal, the collection order to at least one picking console in a preset collection order issuance mode; and
moving, by a robot, a cargo box to a corresponding picking console so that goods corresponding to the stock keeping units recorded in the collection order are picked out;
wherein the sending the collection order to at least one picking console in a preset collection order issuance mode comprises:
taking all picking consoles as a whole, and issuing the collection order to all the picking consoles so that goods corresponding to stock keeping units recorded in all issued collection orders can be picked out at any picking console;
wherein a certain stock keeping unit in the collection order is not set to a corresponding picking console in advance, and a picking console for picking the goods is dynamically changed.

2. The goods sorting method according to claim 1, wherein the moving a cargo box to a corresponding picking console comprises:
determining an estimated task completion time of each picking console according to one or more related factors; and
moving the cargo box to a picking console with a shortest estimated task completion time.

3. The goods sorting method according to claim 2, wherein the related factors comprise: a length of a current picking queue of the picking console and/or an estimated time for the cargo box to arrive at the picking console.

4. The goods sorting method according to claim 1, wherein the sending the collection order to at least one picking console in a preset collection order issuance mode comprises:
splitting the collection order with a stock keeping unit as a unit;
allocating a stock keeping unit recorded in the collection order to a corresponding picking console, so that each picking console forms a corresponding picking list.

5. The goods sorting method according to claim 4, wherein the allocating a stock keeping unit recorded in the collection order to a corresponding picking console comprises:
determining candidate picking consoles selectable for the current stock keeping unit;
allocating a current stock keeping unit to a candidate picking console with a highest priority according to priorities of the candidate picking consoles.

6. The goods sorting method according to claim 5, wherein the allocating the stock keeping unit to a candidate picking console with the highest priority according to priorities of the candidate picking consoles comprises:
calculating lengths of picking lists of the candidate picking consoles; and allocating the current stock keeping unit to a candidate picking console with the smallest picking list length among the candidate picking consoles.

7. The goods sorting method according to claim 6, wherein before the calculating lengths of picking lists of the candidate picking consoles, the method further comprises:
preferentially allocating the current stock keeping unit to a candidate picking console whose picking list comprises a same stock keeping unit as the current stock keeping unit among the candidate picking consoles.

8. The goods sorting method according to claim 5, wherein the determining candidate picking consoles that are selectable for the current stock keeping unit comprises:
allocating a corresponding warehouse region for each picking console; and
determining the candidate picking consoles that are selectable for the current stock keeping unit according to cargo boxes contained in the warehouse region and stock quantities in the cargo boxes.

9. The goods sorting method according to claim 1, wherein the generating at least one collection order comprises:
calculating coincidence proportions of recorded stock keeping units between the different sorting orders; and
combining first n sorting orders with a highest coincidence proportion to form one collection order, wherein n is a predetermined number.

10. The goods sorting method according to claim 1, wherein the generating at least one collection order comprises:
calculating coincidence proportions of recorded stock keeping units between the different sorting orders; and
combining first n sorting orders with the highest coincidence proportion to form one collection order, wherein n is a predetermined number.

11. The goods sorting method according to claim 9, wherein after the step of generating at least one collection order, the method further comprises:
selecting and issuing one or more collection orders among the at least one collection order, to meet a preset preferred condition, wherein the preset preferred condition is that the coincidence proportion of the recorded stock keeping units between a selected collection order and an unselected collection order is smallest.

12. The goods sorting method according to claim 1, further comprising:
performing secondary sorting on all goods picked out to form a plurality of sorting packages corresponding to sorting orders.

13. The goods sorting method according to claim 1, further comprising:
performing secondary sorting on all goods picked out to form a plurality of sorting packages corresponding to sorting orders.

14. The goods sorting method according to claim 1, further comprising: controlling the picking console to pick out goods corresponding to each collection order and place the goods in a region corresponding to each collection order when two or more collection orders are issued to the picking console.

15. A non-transitory computer-readable storage medium, storing computer executable program instructions, wherein the computer executable program instructions, when being called by a processor, cause the processor to perform the goods sorting method according to claim 1.

16. A goods sorting system, comprising a processing terminal, a picking console, and a robot, wherein
the picking console is configured to pick one or more goods from a cargo box; and the robot is configured to transport the cargo box between a warehouse and the picking console; and
the processing terminal is communicatively connected to the picking console and the robot respectively, and is configured to perform the goods sorting method according to claim 1, to control the robot and the picking console to generate an order package corresponding to one or more collection orders.

* * * * *